INVENTOR.
RALPH A. RHODA
BY
Mellin and Hanscom
ATTORNEYS

United States Patent Office 2,806,434
Patented Sept. 17, 1957

2,806,434

PORTABLE PUMP

Ralph A. Rhoda, Berkeley, Calif., assignor to Berkeley Pump Company, Berkeley, Calif., a corporation of California Application November 21, 1955, Serial No. 548,064

1 Claim. (Cl. 103—111)

This invention relates to a portable pump, and more particularly pertains to a trailer type portable pump adapted to be hitched to and driven by a farm tractor or other suitable vehicle.

It is the principal object of this invention to provide a trailer type portable pump adapted to be hitched to the rear end of a tractor and receive its pump drive from the rearwardly extending power take-off shaft thereof.

A preferred form of the invention is described in the following detailed specification, and illustrated by way of example in the accompanying drawings, wherein.

Figure 1:
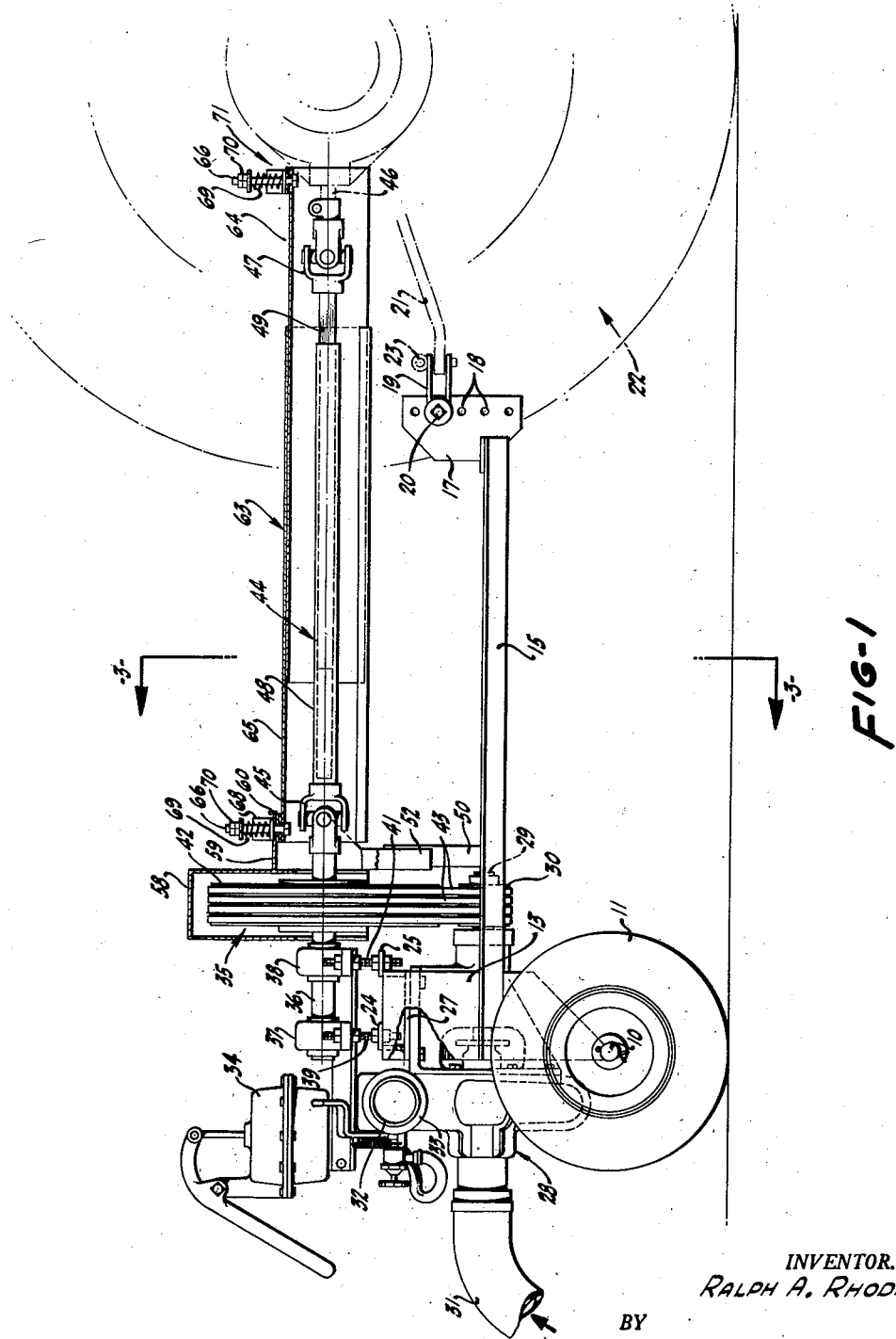
Fig. 1 is a side view of the device partially broken away and showing a portion of the tractor schematically in dot-dash lines.

Referring now to the drawings, wherein similar reference numerals are used to denote the same elements throughout the various views shown, 10 indicates an axle extending transversely and having wheels 11 and 12 rotatably mounted on its opposite ends. Two plates 13 and 14 are fixed to the axle 10, at points equidistant on opposite sides of the center thereof, and extend upwardly therefrom. The plates 13 and 14 are parallel to each other and are in vertical planes parallel to the center line of the device. Two angle iron members 15 and 16 are welded to the outer surfaces of the plates 13 and 14, respectively, and extend diagonally forwardly and inwardly therefrom. The forward ends of the members 15 and 16 are welded together with a vertical plate 17 therebetween to complete a triangular rigid frame. The forward most edge of the plate 17 is vertical, and a plurality of spaced holes 18 are provided adjacent thereto. A U-shaped connector 19 is adapted to be selectively fastened to the plate 17 by a bolt 20 extending through one of the holes 18. The connector or hitch 19 is adapted to be connected to a tongue 21 on a tractor, generally indicated at 22, by a pin 23.

Figure 2:
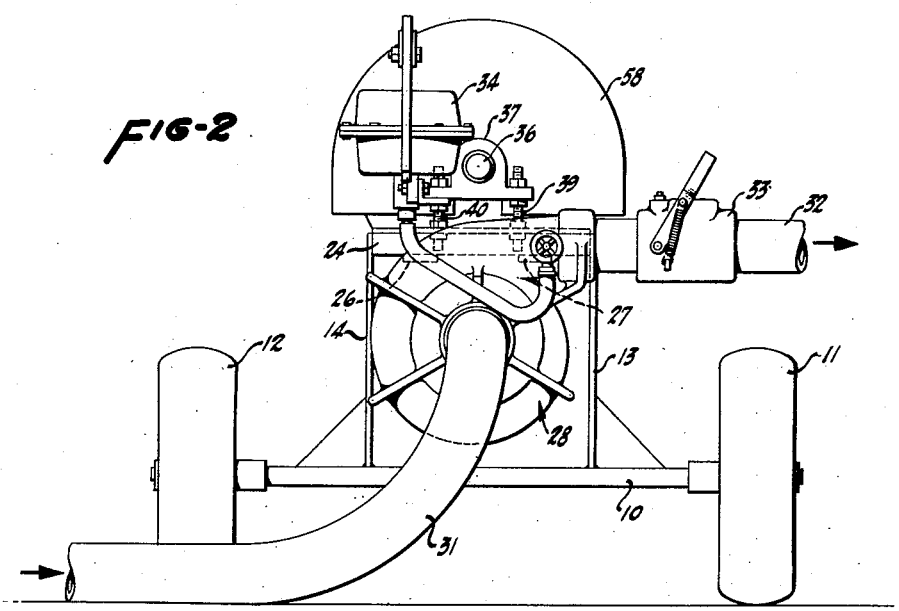
Fig. 2 is a rear view of the device shown in Fig. 1.

The upper ends of the plates 13 and 14 are connected by a pair of transversely extending parallel angle members 24 and 25. As best seen in Fig. 2, a pair of longitudinally extending flat bars 26 and 27 are fixed to the bottom of the vertical flanges of the angle members 24 and 25, one adjacent to but spaced from each of the vertical plates 13 and 14. A centrifugal pump, generally indicated at 28, is bolted or otherwise fastened to the bars 26 and 27. The pump shaft 29 extends forwardly from the pump housing and is provided with a multi-grooved drive pulley 30. The pump 28 is provided with the usual intake or suction line 31, an outlet 32 with a gate valve 33 incorporated therein, and a hand-operated priming pump 34.

The drive mechanism for the pump 28 is generally indicated at 35, and is best illustrated in Fig. 1. The drive mechanism 35 comprises a shaft 36 rotatably supported by two pillow blocks or bearings 37 and 38. The pillow block 37 is supported by two threaded bolts 39 and 40 fixed to the transversely extending angle member 24, previously described, and extending upwardly therefrom. The flanges on the pillow block 37 are each provided with a bore through which one of the threaded bolts 39 or 40 extends. Nuts threaded onto the bolts, one above and one below each of the flanges, adjustably support the pillow block relative to the bolts. Similarly, the pillow block 38 is adjustably supported relative to the angle member 25 by a pair of bolts (one of which is shown at 41) fixed to the angle member 25. A large diameter grooved drive pulley 42 is fixed to the shaft 36 in vertical alignment with the drive pulley 30 on the pump shaft 29. A plurality of V-type drive belts 43 connect the two pulleys.

One end of a drive shaft, generally indicated at 44, is connected to the forward end of the shaft 36 by a universal joint 45. The other end of the drive shaft 44 is connected to a power take-off shaft 46 on the tractor 22 by a second universal joint 47. The drive shaft 44 is made in two sections 48 and 49, with the section 49 telescopically received within the section 48 to permit extension and contraction of the drive shaft.

Figure 3:
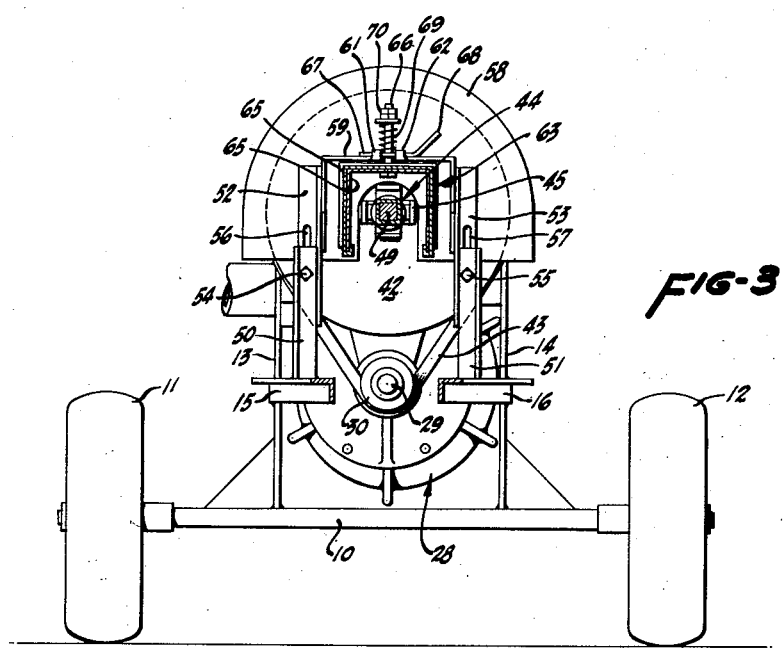
Fig. 3 is a sectional view taken on line 3—3 of Fig. 1.

As best seen in Fig. 3, two angle members 50 and 51 are fixed to the members 15 and 16, respectively, and extend upwardly therefrom. A second pair of angle members 52 and 53 are adjustably fastened to the members 50 and 51, respectively, by bolts 54 and 55 which extend through suitable holes in the members 50 and 51, and elongated longitudinally extending slots 56 and 57 in the members 52 and 53, respectively. A semi-circular hood 58 is fixed to the upper members 52 and 53 and encompasses the upper portion of the drive pulley 42.

A rectangular inverted U-shaped housing 59 is fixed to the inner surfaces of the angle members 52 and 53, and to the forward surface of the hood 58. The front edge of the upper portion of the housing 59 is provided with a rearwardly extending slot 60, and a pair of upturned ears 61 and 62 is formed integral with the forward edge of the housing 59, one on either side of the slot 60 for purposes described herebelow.

An inverted U-shaped shaft housing 63, made in two telescoping sections 64 and 65, encompasses the drive shaft 44. A bolt 66 extends upwardly through a suitable hole provided in the upper portion of the section 65 adjacent the rear end thereof. A lock member 67, having one upturned end 68, is rotatably mounted on the bolt 66 above the housing section 64. A compression spring 69 encompasses the bolt 66, and is confined between the lock member 67 and a nut 70 threaded on the upper end of the bolt.

In mounting the housing 63 over the drive shaft 44, the lock member 67 is turned so that it extends longitudinally of the housing with the upturned end 68 thereof extending rearwardly. The housing is then slid rearwardly relative to the housing 59, so that the lock member 67 slides over the ears 61 and 62 and the bolt 66 is received within the slot 60. The lock member 67 is then turned laterally relative to the housing 59 so that the side edges thereof engage the ears 61 and 62 to retain the housings 59 and 63 in interlocking engagement with each other. The forward end of the housing 63 is provided with a similar locking mechanism, generally indicated at 71, which cooperated with suitable structure (not shown) on the tractor adjacent the power take-off shaft 46.

As can be seen from the foregoing description, I have provided a portable pump which may be hitched to the back of a farm tractor and towed to a stream or other source of water. When the desired location is reached, suction host 31 is placed in the stream and the primer pump 34 actuated until the pump 28 is filled with water, then the pump 28 is started and driven by the tractor power take-off shaft 46 through the drive shaft 44, shaft 36, pulleys 30 and 42 and belts 43. If it is desired to change the drive ratio between the power take-off shaft 46 and the pump 28, it is merely necessary to change the pulley 30 on the pump shaft 29, and raise or lower the pillow blocks 37 and 38 to provide the correct tension on the belts 43.

While I have shown and described the preferred form of my invention, it is obvious that various changes may be made in its construction by those skilled in the art, without departing from the spirit of the invention as defined in the appended claim.

Having thus described my invention, what I claim and desire to secure by Letters Patent is:

A portable pump comprising a frame, an axle supported by said frame and extending transversely at one end thereof, a pair of wheels one rotatably mounted on each end of said axle, a hitch on the other end of said frame adapted to be connected to a vehicle, a rotary pump having a shaft mounted on said frame with the axis of rotation of said pump extending longitudinally of said frame, a drive shaft containing a universal joint on said frame, a plurality of bearings spaced longitudinally of said drive shaft to support said drive shaft on said frame in parallel relation to said pump axis, a housing for each of said bearings, screw threaded elements secured to said frame supporting said housing in relation to said frame, nuts threaded on said screw threaded elements and engageable with opposite portions of said housings to vary the distance between the axes of said drive shaft and said pump rectilinearly while maintaining said axes in parallel relation, a first drive pulley on said pump, a second drive pulley on said pump shaft intermediate said universal joint and said bearings, a drive belt connecting said first and second pulleys, and a coupling to connect said drive shaft to a vehicle power take-off shaft for driving said shaft and said pump.

References Cited in the file of this patent
UNITED STATES PATENTS

| | | |
|---|---|---|
| 2,350,116 | Kimes | May 30, 1944 |
| 2,598,780 | Garnier | June 3, 1952 |
| 2,620,965 | Miller | Dec. 9, 1952 |
| 2,664,052 | Schmidt | Dec. 29, 1953 |
| 2,698,583 | House et al. | Jan. 4, 1955 |
| 2,733,661 | Surgi | Feb. 7, 1956 |